United States Patent
Pretty (10) Patent No.: US 10,179,639 B2
(45) Date of Patent: Jan. 15, 2019

(54) ATTACHMENT SYSTEM FOR THERMAL PROTECTION PANELS

(71) Applicant: Rohr, Inc., Chula Vista, CA (US)

(72) Inventor: Michael Sean Pretty, El Cajon, CA (US)

(73) Assignee: ROHR, INC., Chula Vista, CA (US)

(*) Notice: Subject to any disclaimer, the term of this patent is extended or adjusted under 35 U.S.C. 154(b) by 19 days.

(21) Appl. No.: 13/887,926

(22) Filed: May 6, 2013

(65) Prior Publication Data
US 2014/0326431 A1  Nov. 6, 2014

(51) Int. Cl.
*B64C 1/40* (2006.01)
*F02C 7/24* (2006.01)
*F16B 37/14* (2006.01)

(52) U.S. Cl.
CPC .............. *B64C 1/403* (2013.01); *F02C 7/24* (2013.01); *F16B 37/14* (2013.01); *F05D 2260/231* (2013.01); *F05D 2260/31* (2013.01); *Y02T 50/672* (2013.01); *Y02T 50/675* (2013.01)

(58) Field of Classification Search
CPC ........ F16B 37/14; F16B 33/004; F01N 13/10; F01N 13/1855; F28F 9/00; F16L 59/02; F16L 59/10; F16L 59/00; A41D 13/005; A47G 3/00; F16J 13/00; B64C 1/403; B64C 1/12; B64C 1/40; B65D 81/38; B65D 81/3802; B65D 43/22; B65D 2251/1058
USPC ..... 165/46; 411/372.5, 372.6, 373; 244/132; 292/10, 13, 19, 20, 80, 81, 87, 88, 91, 292/303; 220/592.2, 835, 324
See application file for complete search history.

(56) References Cited

U.S. PATENT DOCUMENTS

| | | | |
|---|---|---|---|
| 3,930,432 A | | 1/1976 | Puchy |
| 4,214,505 A | * | 7/1980 | Aimar ..................... F16B 5/126 24/350 |
| 4,394,096 A | * | 7/1983 | Stevens ...................... 403/408.1 |
| 4,709,567 A | * | 12/1987 | Appelbaum .......... E05B 17/183 70/455 |
| 5,103,538 A | * | 4/1992 | Ryder ............................ 24/662 |
| 5,175,665 A | | 12/1992 | Peg |
| 5,501,559 A | * | 3/1996 | Lenherr .................. F16B 37/14 411/373 |
| 5,653,564 A | | 8/1997 | Nakamura |
| 5,676,511 A | | 10/1997 | Meylan |

(Continued)

FOREIGN PATENT DOCUMENTS

| | | |
|---|---|---|
| CN | 1153260 | 7/1997 |
| CN | 101566078 | 10/2009 |

(Continued)

OTHER PUBLICATIONS

DE202009012753U1—English Machine Translation.*

(Continued)

*Primary Examiner* — Orlando E Aviles Bosques
*Assistant Examiner* — Jose O Class-Quinones
(74) *Attorney, Agent, or Firm* — Snell & Wilmer L.L.P.

(57) ABSTRACT

A thermally protected attachment system is provided. A device including a cover hingeably coupled to a thermal blanket is provided. The thermal blanket and cover may be configured to insulate a cavity defined by the interior of the thermal blanket and the cover in response to the cover being in a closed position. The thermal blanket may be coupled to a thermal protection panel of an aircraft.

12 Claims, 7 Drawing Sheets

(56) References Cited

U.S. PATENT DOCUMENTS

| | | | |
|---|---|---|---|
| D609,082 S | 2/2010 | Camisasca et al. | |
| 2008/0047829 A1* | 2/2008 | Ogawa et al. | 204/275.1 |
| 2009/0126973 A1* | 5/2009 | Martin Hernandez | 174/138 D |
| 2009/0162139 A1* | 6/2009 | Miller et al. | 403/296 |
| 2010/0034614 A1* | 2/2010 | Dean et al. | 411/372.6 |
| 2011/0151184 A1* | 6/2011 | Jundt et al. | 428/138 |
| 2012/0308369 A1* | 12/2012 | Maheshwari | B64D 33/02 415/182.1 |
| 2012/0328427 A1 | 12/2012 | Holland | |
| 2013/0008214 A1 | 4/2013 | Lang et al. | |

FOREIGN PATENT DOCUMENTS

| | | | | |
|---|---|---|---|---|
| DE | 202009012753 U1 * | 2/2011 | | E04F 13/0837 |
| EP | 2505857 A1 * | 3/2012 | | F16B 37/14 |
| EP | 2505857 | 10/2012 | | |
| EP | 2537756 | 12/2012 | | |
| GB | 2489472 | 10/2012 | | |
| WO | 03045684 | 6/2003 | | |

OTHER PUBLICATIONS

International Search Report and Written Opinion dated Jun. 18, 2014 in Application No. PCT/US2014/020767.
Written Opinion of the IPEA dated Mar. 27, 2015 in Application No. PCT/US14/20767.
International Preliminary Report on Patentability dated Aug. 14, 2016 in Application No. PCT/US2014/020767.
Extended European Search Report dated Mar. 16, 2016 in European Application No. 14794272.6.
Second Office Action dated Dec. 26, 2016 in Chinese Application No. 201480004141.9.
Office Action dated Mar. 29, 2016 in Chinese Application No. 201480004141.9.
Third Office Action dated Jul. 7, 2017 in Chinese Application No. 201480004141.9.

* cited by examiner

ATTACHMENT SYSTEM FOR THERMAL PROTECTION PANELS

FIELD

The present disclosure relates to attachment systems, and more particularly, to associated thermal effects on attachment systems and related surfaces.

BACKGROUND

The engines of jet aircraft typically produce immense heat. Shielding of this heat in particular locations may be desirable.

SUMMARY

According to various embodiments, a device including a cover hingeably coupled to a thermal blanket is disclosed. The thermal blanket and cover may be configured to insulate a cavity defined by the interior of the thermal blanket and the cover in response to the cover being in a closed position. The thermal blanket may be coupled to a thermal protection panel of an aircraft.

According to various embodiments, a thermally protected attachment system is disclosed which may include a thermal blanket configured to surround the perimeter of a fastener; and a removable cover coupled to the thermal blanket. A cavity may be formed between the interior of the thermal blanket and the interior of the cover. A portion of the fastener, such as the exposed portion of the fastener, may be housed within the cavity.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure improves the thermal protection of a portion of a vehicle (e.g., an aircraft), and more particularly reduces the amount heat translated through the attachment points and/or locations of a thermal protection system (TPS), such as bond line 270 associated with a thermal protection system. Designers of thermal protection systems of bonded structures should be mindful that the attachment points (e.g., a metallic attachment/fastener location) may translate heat from the surface of the thermal protection systems and/or exposed surface of the fastener down into the thermal protection systems through the fastener. To avoid or minimize this and other undesirable consequences, an attachment system for thermal protection panels configured to reduce translated and/or conducted heat is described herein. Thus, the thermally protected attachment system described herein is configured to protect bond line 270 of the thermal protection system from exceeding a preselected temperature. In various embodiments, the thermally protected attachment system described herein is configured to protect the fastener from exceeding a preselected temperature. In various embodiments, the attachment system allows for access to the fastener. In various embodiments, a bond line may comprise the interface of a first composite material and a second composite material, a first metallic material and a second metallic material, and/or a first metallic material and a first composite material In various embodiments, the attachment system, apparatus and method for thermally protecting vehicle elements, such as fasteners of thermal protection panels, (collectively, "attachment system 100") is disclosed herein. Stated another way, attachment system 100 is configured to insulate a fastener 110. Thus, fastener 110 in connection with attachment system 100 will tend to radiate less heat through its attachment locations as compared with conventional fastener not having the benefit of attachment system 100. For instance, attachment system 100 may protect a fastener from reaching a temperature that causes damage to the panel that it retains. Additionally, with momentary reference to FIG. 5A, attachment system 100 may limit a temperature of a bond line 270 measured proximate and/or coupled to fastener 110 from reaching a preselected temperature, such as over 100 degrees Fahrenheit (37.8 degrees Celsius), over 200 degrees Fahrenheit (93.3 degrees Celsius), over 250 degrees Fahrenheit (121.1 degrees Celsius) or over 300 degrees Fahrenheit (148.9 degrees Celsius). Thermal protection panel 200 may bonded to a structure via bond line 270. This preselected temperature may be selected and based on the materials of the thermal protection system. This reduction in temperature and/or temperature limiting may protect materials from heat damage. This reduction in temperature may extend the service life of the element protected by a thermal protection panel 200 and/or the service life of thermal protection panel 200. Attachment system 100 may also assist fastener 110 in having a substantially constant temperature from its exposed surface to its distal threaded end located within a fastened structure, such as a thermal protection panel 200.

Figure 1:
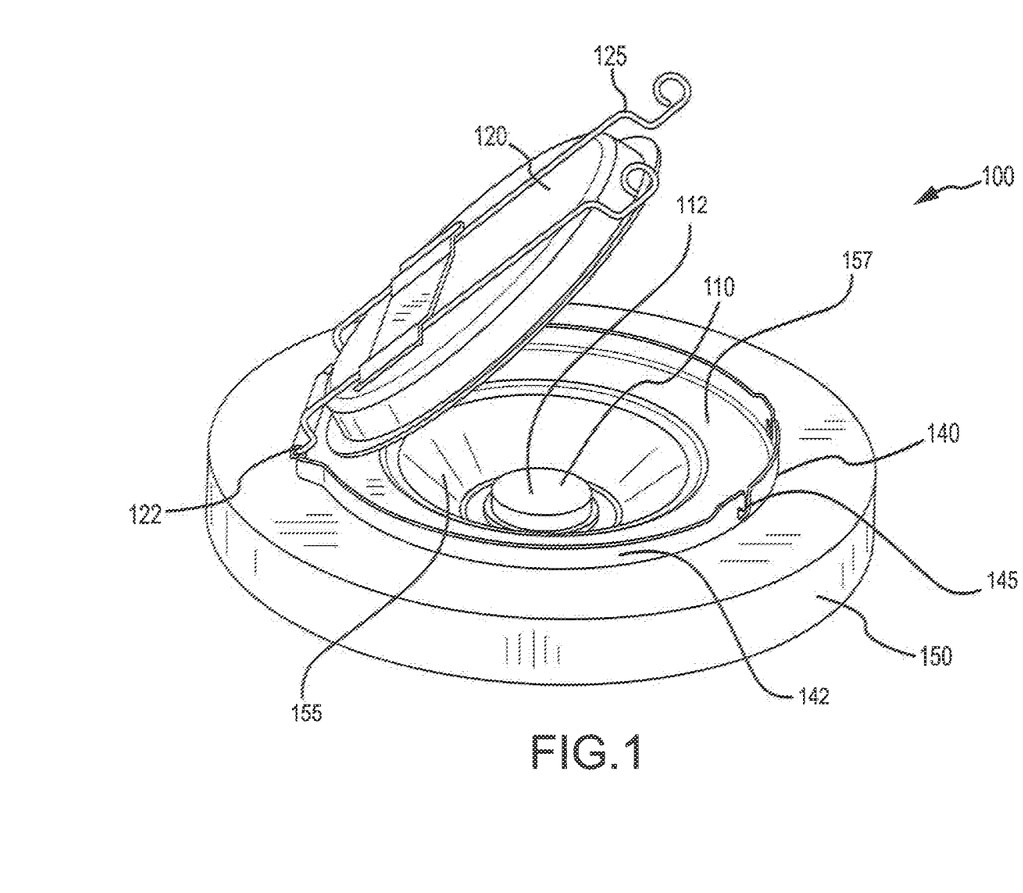
FIG. 1 illustrates a perspective view of an attachment system for thermal protection panels in an open position in accordance with various embodiments.

According to various embodiments and with reference to FIG. 1, attachment system 100 may comprise a cover 120, a thermal blanket 150, and a fastener 110, such as a nut or bolt. Attachment system 100 may further comprise a locking mechanism 125 to assist in retaining cover 120 in a closed position. This closed position may comprise forming a seal between thermal blanket 150 and cover 120.

According to various embodiments, thermal blanket 150 may protect fastener 110 and/or the surface and/or air flow surrounding fastener 110 from high heat, such as heat over 250 degrees Fahrenheit (121.1 degrees Celsius). Thermal blanket 150 may comprise any suitable material for acting as a thermal barrier. For instance, thermal blanket 150 may comprise a silicon reinforced skin, a ferrous metal, polyimide film, such as KAPTON (available from E. I. du Pont de Nemours and Company, Wilmington, Del.) non-ferrous metal, alloy, stainless steel, such as type 301 stainless steel, a steel alloy, such as steel alloy A-286, and/or composite material such as a graphite epoxy composite material. Thermal blanket 150 may be any desired shape; however, as depicted in FIGS. 1-6, thermal blanket 150 is generally circular in shape, such as disk shaped, generally encompassing the perimeter of fastener 110. The thickness of thermal blanket 150 as measured from the surface of thermal protection panel 200, as depicted in FIG. 3, may be determined based on the temperature measured at the surface of thermal protection panel 200 as measured during operation of a heat producing device.

According to various embodiments, the thermal blanket 150 thickness may be between about 0.2 and about 0.5 inches (about 0.508 and about 1.27 centimeter), such as about 0.25 inches (about 0.635 centimeter) and/or about 0.375 inches (about 0.9525 centimeter). Additionally, the thickness of thermal blanket 150 may be constrained by the environment of the attachment system 100. For instance, proximity to engine blades may constrain the dimensions of elements of attachment system 100 and/or thermal blanket 150.

Figure 5A:
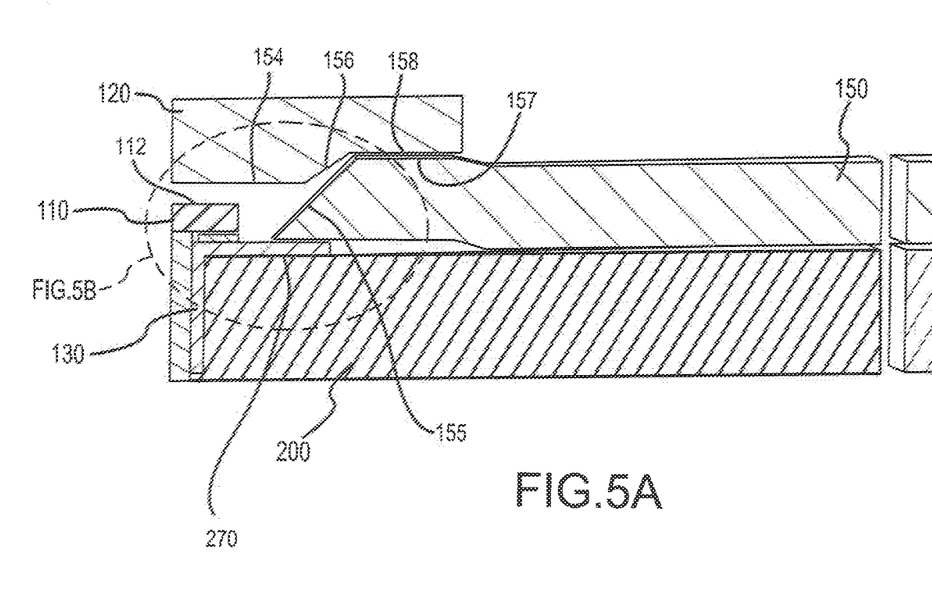
FIG. 5A illustrates a close-up cross-sectional side cut-away view of the attachment system of FIG. 2, for thermal protection panels in accordance with various embodiments.
Figure 5B:
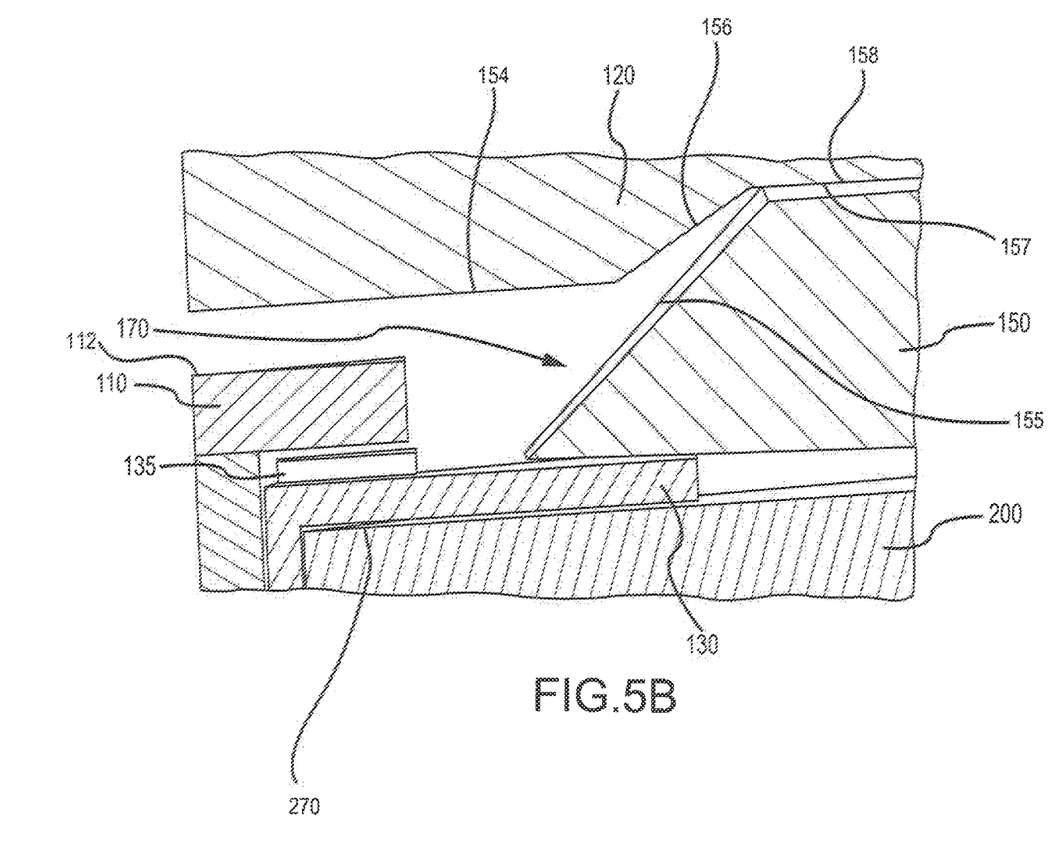
FIG. 5B illustrates detail 5B of FIG. 5A, in accordance with various embodiments.

According to various embodiments, and with brief reference to FIG. 5B, the coupling of thermal blanket 150 and cover 120 may form cavity 170. For instance, cover 120 and/or thermal blanket 150 may be shaped such that no portion of cover 120 and/or thermal blanket 150 makes contact with fastener 110. Thus, attachment system 100 is configured to house a portion of fastener 110, such as the portion of fastener 110 left exposed for removal of fastener 110 without making contact with cover 120 and/or thermal blanket 150. In this way, heat is not directly transferred between surfaces, such as through interference between a surface of cover 120 and/or thermal blanket 150 and fastener 110. Thermal blanket 150 may comprise an angled internal surface 155. Angled internal surface 155 may be configured to comprise a perimeter of cavity 170. Stated another way, angled internal surface 155 may comprise a ring shape and define a portion of cavity 170. Cover 120 may comprise a surface, such as an angled surface 156 which, according to various embodiments, does not contact angled internal surface 155. Thermal blanket 150 may comprise a generally horizontal surface, such as surface 157, configured to interface with and or contact a surface of cover 120, such as generally horizontal surface 158 of cover 120.

Figure 3:
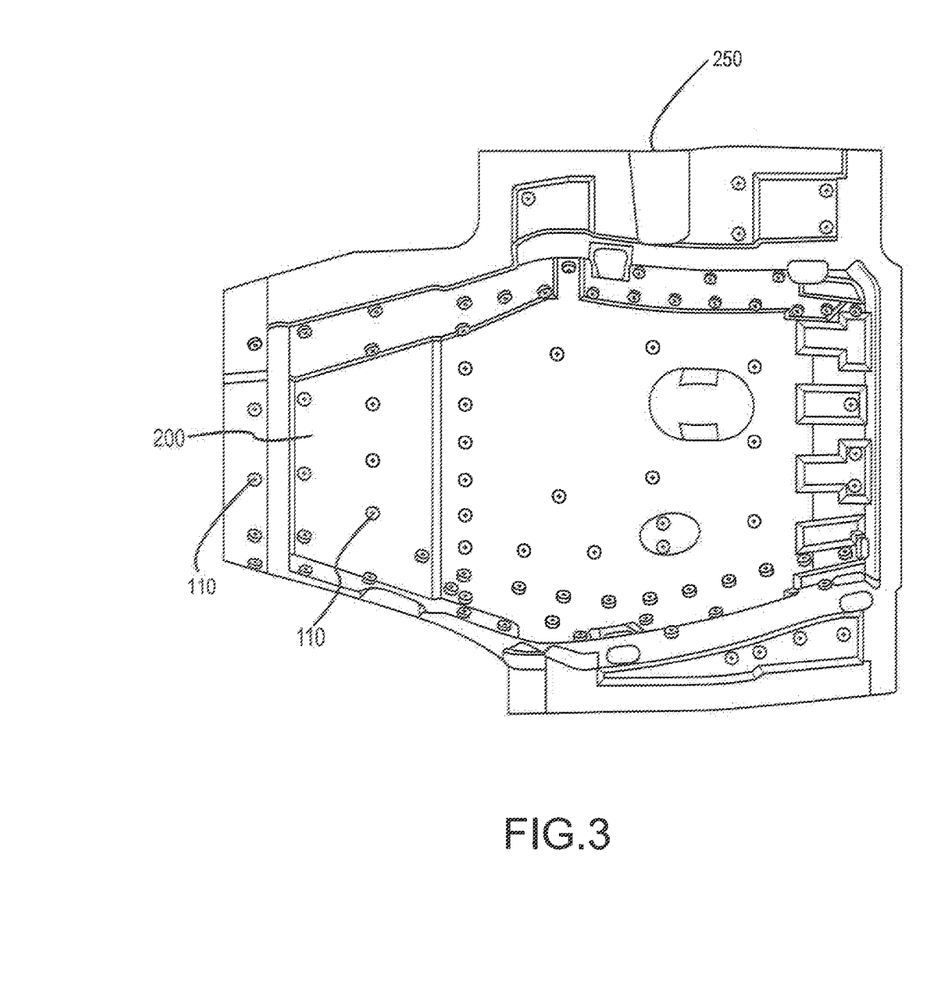
FIG. 3 illustrates exemplary thermal protection systems for use with a plurality of fasteners in accordance with various embodiments.
Figure 4:
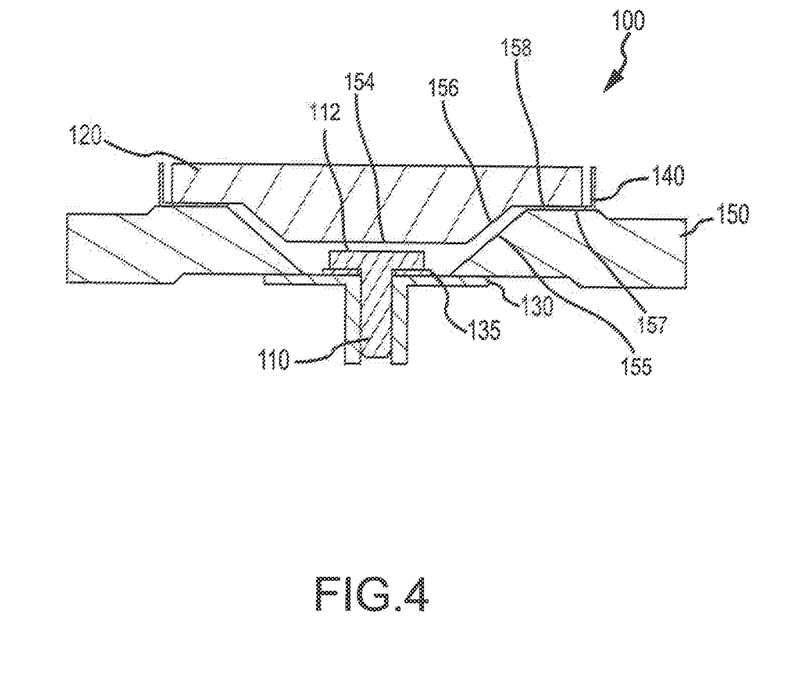
FIG. 4 illustrates a cross-sectional side cut-away view of the attachment system of FIGS. 1 and 2, for thermal protection panels in accordance with various embodiments.

According to various embodiments, cover 120 may be any desired shape. Cover 120, which may be integral to and/or coupled to thermal blanket 150, may sealably contain a portion of fastener 110, such as an exposed portion of fastener 110, exposed beyond the coupled surface. Stated another way, cover 120 and thermal blanket 150 working in concert may sealably contain a portion of fastener 110. Cover 120 may comprise any suitable material for acting as a thermal barrier. For instance, thermal blanket 150 may a ferrous metal, non-ferrous metal, alloy, stainless steel, a steel alloy, and/or composite material such as a graphite epoxy composite material. Cover 120 may be any desired shape; however, as depicted in FIGS. 1-6, cover 120 is generally disk shaped. According to various embodiments, at least a portion of cover 120 is located directly over fastener 110, such as directly over the exposed face 112 of fastener 110. For instance as depicted in FIG. 4, a bottom surface 154 of cover 120 may be generally parallel to the plane of the exposed face 112 of fastener 110. There may be an air gap within cavity 170 between bottom surface 154 and exposed face 112 of fastener 110.

Figure 2:
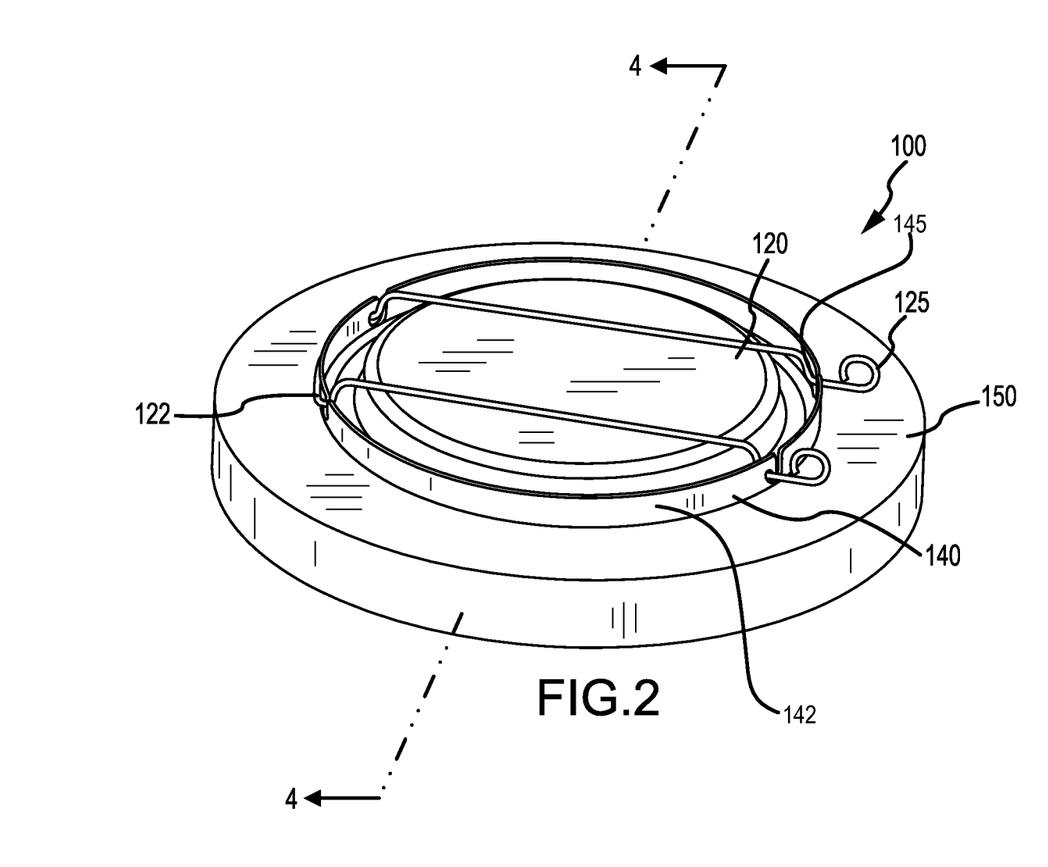
FIG. 2 illustrates a perspective view of the attachment system of FIG. 1 in a closed position in accordance with various embodiments.

According to various embodiments, and with reference to FIGS. 1 and 2, attachment system 100 may be moved from an open first position to a closed second position. For instance, FIG. 1 depicts attachment system 100 in an open position and FIG. 2 depicts attachment system 100 in a closed position. Though elements of attachment system 100 may move in any suitable method, according the embodiment depicted in FIGS. 1 and 2, cover 120 is hingeably coupled to a retaining ring 140, such as via hinge 122. Locking mechanism 125 may engage with a portion of retaining ring 140, such as receiving slot 145, to secure cover 120 in the closed position. Locking mechanism 125 may be a semi-permanent locking mechanism. For instance, locking mechanism 125 may be opened and/or closed by an operator with relative ease and high rate of speed.

For instance, and with reference to FIG. 3, thermal protection panel 200 may comprise a plurality of fasteners. For instance, FIG. 3 depicts a surface of engine housing, such as a nacelle 250, having a plurality of fasteners 110 to couple at least one thermal protection panel 200 to nacelle 250. Depicted in FIG. 3 are individual are attachment systems 100 for each individual fastener 110. Thus, each attachment systems 100 may insulate a single fastener 110. The design of the attachment system 100 takes into account negatively impact thermal protection assembly time beyond a reasonable amount of time. Stated another way, a fabricator or maintenance individual must be able to access each fastener 110 location, fasten each fastener 110, and close cover 120 at an efficient rate to securely fasten each fastener 110. Also, attachment system 100 allows for the ease of inspecting each fastener 110 by moving cover 120 from the closed position to the open position.

According to various embodiments, a portion of retaining ring 140 (e.g., a lip 142 of retaining ring 140) may extend in a direction away from thermal blanket 150 and higher than the thickness of cover 120 where cover 120 meets thermal blanket 150. Lip 142 may reduce air flow from lifting cover 120 from the closed position.

According to various embodiments and with reference to FIG. 4, a side cut-away view of attachment system 100 coupled with fastener 110 are depicted. Attachment system 100 coupled with fastener 110 may comprise a threaded insert 130 mated with thermal protection panel 200. Threaded insert 130 may be fastened and/or mated with thermal protection panel 200 though any desired coupling means, however, as depicted, threaded insert 130 may be glued, adhered and/or epoxied to thermal protection panel 200. Fastener 110 may be coupled to threaded insert 130 though any desired coupling means however, as depicted in FIG. 4, fastener 110 is threaded into threaded insert 130. Cover 120 may be fastened and/or mated with thermal blanket 150 though any desired coupling means, however, as depicted, cover 120 may be point welded to thermal blanket 150. Attachment system 100 coupled with fastener 110 may comprise a washer, such as crescent washer 135.

According to various embodiments, and with reference to FIGS. 5A and 5B, cavity 170 is depicted. Notably, in various embodiments, no portion of fastener 110 directly contacts cover 120 or thermal blanket 150. Moreover, angled surfaces 156 and 155 of cover 120 and thermal blanket 150 do not directly make contact. Thus, the transfer of heat by conduction is reduced as there is no direct contact between these elements and angled surfaces respectively.

Figure 6:
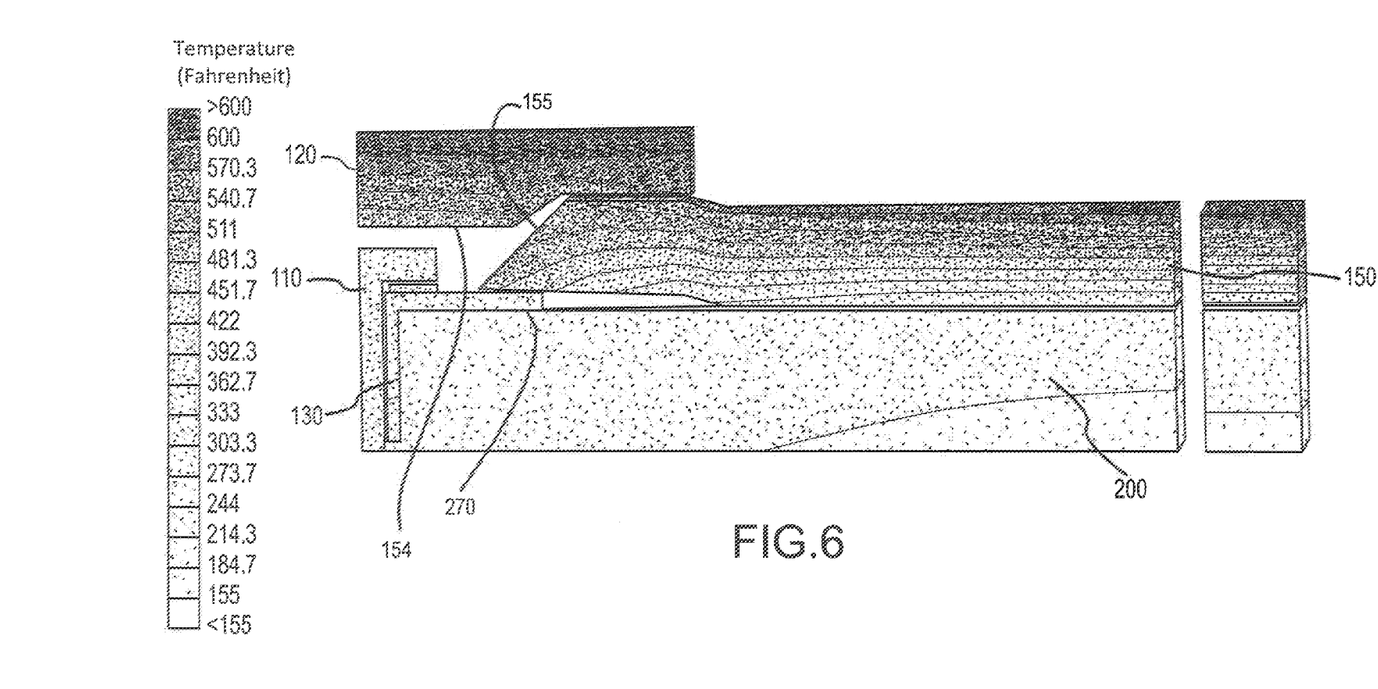
FIG. 6 illustrates exemplary thermal properties of the embodiment depicted in FIG. 5A, in accordance with various embodiments.

According to various embodiments, and with reference to FIG. 6, representative thermal dissipation through cover 120 and thermal blanket 150 are depicted. Representative temperature levels are depicted by the density of the points. The actual measured temperatures of attachment system 100 will vary according to the materials used within attachment system 100. Also, the placement relative to a heat source will affect these values. FIG. 6 depicts the general relative thermal properties of attachment system 100. Stated another way, FIG. 6 depicts that while the exterior temperature of attachment system 100 is much greater relative to the interior cavity 170 defined by the bottom surface 154 of cover 120 and angled interior surface 155 of thermal blanket 150. Also, FIG. 6 illustrates that the temperature of the exposed face 112 of fastener 110 is generally the same a temperature of fastener 110 within and/making contact with thermal protection panel 200. Thus, attachment system 100 prevents heat from being transferred through fastener 110 into an interior of thermal protection panel 200.

In various embodiments, attachment system 100 disclosed herein may be employed with any suitable fastener on any surface, such as for use with, on and/or in any vehicle and/or any fastener location experiencing high heat, such as heat over 250 degrees Fahrenheit (121.1 degrees Celsius). In various embodiments, attachment system 100 described herein improves the thermal properties and thermal characteristics of an entire attachment system including the modality of semi-permanent attachment and/or efficacy of removable shielding to locations.

According to various embodiments, thermal blanket 150 may be secured to a surface, such as thermal protection panel 200. Thermal blanket 150 may be hingeably coupled to cover 120. Fastener 110 may be inserted into thermal protection panel 200 and/or a retaining structure housed by thermal protection panel 200. Fastener 110 may be inserted within an interior ring formed by an interior surface 155 of thermal blanket 150.

In response to sealably closing cover 120 to make contact with thermal blanket 150, the cavity formed between the interior surface of cover 120 and the interior ring formed by angled interior surface 155 of thermal blanket 150 is insulated. Cover 120 may be temporarily locked in the closed position via a removable locking mechanism 125. This removable locking mechanism 125 may be a spring clip. Thus, an operator may unlock the locking mechanism 125 as desired by applying force in the direction opposite the biasing of the spring such that locking mechanism 125 of cover 120 may be removed from receiving slots 145 in retaining ring 140 coupled to thermal blanket 150. Cover 120 held in place by locking mechanism 125 and receiving slots 145 may be welded in the closed position as desired at any time. Locking mechanism 125 assists with retaining of cover 120 in the closed position for welding.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. Different cross-hatching is used throughout the figures to denote different parts but not necessarily to denote the same or different materials. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermally protected attachment system, comprising:
a thermal blanket comprising a first conical surface extending radially outward from a base portion of the thermal blanket and surrounding a perimeter of a fastener extending through the base portion and a first horizontal surface extending radially outward from the first conical surface,
wherein the first conical surface of the thermal blanket is spaced a first distance from the fastener; and
a cover comprising a second horizontal surface spaced a second distance from the fastener, a second conical surface extending from the second horizontal surface radially inward toward the base portion and spaced radially inward from the first conical surface and a third horizontal surface extending radially outward from the second conical surface and configured to interface with the first horizontal surface of the thermal blanket,
wherein a cavity is formed by a region bounded by the first conical surface, the second conical surface and the second horizontal surface, and
wherein a portion of the fastener is sealably contained within the cavity.

2. The thermally protected attachment system of claim 1, further comprising a retainer housing coupled to the thermal blanket, wherein the retainer housing comprises a locking mechanism to secure the cover in a closed position.

3. The thermally protected attachment system of claim 2, wherein the retainer housing comprises a lip to restrict air flow from moving the cover from the closed position to an open position.

4. The thermally protected attachment system of claim 1, wherein the cover forms an airtight seal against an exterior of the thermal blanket to sealably contain the portion of the fastener in the cavity.

5. The thermally protected attachment system of claim 1, wherein the first horizontal surface is configured to contact with the third horizontal surface while in the closed position.

6. The thermally protected attachment system of claim 1, wherein the thermally protected attachment system is configured for coupling to a panel of an engine.

7. The thermally protected attachment system of claim 1, wherein the thermally protected attachment system is configured for coupling to an aircraft.

8. The thermally protected attachment system of claim 1, wherein at least one of the cover and the thermal blanket comprises at least one of a ferrous metal, a silicon reinforced skin, a polyimide film, a non-ferrous metal, an alloy, a stainless steel, a steel alloy, and a graphite epoxy composite material.

9. The thermally protected attachment system of claim 1, further comprising at least one of a washer and a threaded bushing.

10. The thermally protected attachment system of claim 1, wherein the thermal blanket is between 0.25 inches and 0.375 inches thick.

11. A method comprising;
securing a thermal blanket to a panel, wherein the thermal blanket comprises
a first conical surface extending radially outward from a base portion of the thermal blanket and surrounding a perimeter of a fastener extending through the base portion and a first horizontal surface extending radially outward from the first conical surface and
a hinged cover, the hinged cover comprising a second horizontal surface spaced a distance from the fastener, a second conical surface extending from the second horizontal surface radially inward toward the base portion and spaced radially inward from the first conical surface and a third horizontal surface extending radially outward from the second conical surface and configured to interface with the first horizontal surface of the thermal blanket;
inserting a fastener into the panel within an interior cavity defined by a region bounded by the first conical surface, the second conical surface and the second horizontal surface;
closing the hinged cover, wherein in response to closing the hinged cover, the interior cavity is sealed and insulated; and
locking the hinged cover via a removable locking mechanism coupled to the thermal blanket and the hinged cover.

12. The method of claim 11, wherein the hinged cover forms an airtight seal against an exterior of the thermal blanket to sealably contain a portion of the fastener within the interior cavity.

* * * * *